United States Patent
Taylor et al.

(10) Patent No.: US 7,340,151 B2
(45) Date of Patent: Mar. 4, 2008

(54) HIGH-SPEED SEARCH OF RECORDED VIDEO INFORMATION TO DETECT MOTION

(75) Inventors: Eric L. Taylor, Irvine, CA (US); Robert Alan Seago, Irvine, CA (US)

(73) Assignee: General Electric Company, Schenectady, NY (US)

(*) Notice: Subject to any disclaimer, the term of this patent is extended or adjusted under 35 U.S.C. 154(b) by 1032 days.

(21) Appl. No.: 10/389,671

(22) Filed: Mar. 14, 2003

(65) Prior Publication Data

US 2003/0228128 A1    Dec. 11, 2003

Related U.S. Application Data

(60) Provisional application No. 60/364,874, filed on Mar. 14, 2002.

(51) Int. Cl.
   *H04N 5/91* (2006.01)
(52) U.S. Cl. .......................... 386/69; 386/70
(58) Field of Classification Search .............. 386/69, 386/70; 382/173; 358/538
   See application file for complete search history.

(56) References Cited

U.S. PATENT DOCUMENTS

| | | | |
|---|---|---|---|
| 5,267,034 A * | 11/1993 | Miyatake et al. | 348/352 |
| 5,515,296 A * | 5/1996 | Agarwal | 709/204 |
| 5,600,794 A * | 2/1997 | Callon | 709/241 |
| 6,516,090 B1 | 2/2003 | Lennon et al. | 382/173 |
| 6,757,646 B2 * | 6/2004 | Marchisio | 704/8 |

FOREIGN PATENT DOCUMENTS

EP    1 229 547    8/2002

\* cited by examiner

*Primary Examiner*—Thai Q. Tran
*Assistant Examiner*—Hung Dang
(74) *Attorney, Agent, or Firm*—Klarquist Sparkman LLP

(57) ABSTRACT

A system and methods are described for high speed searching of digital video data 20 to find regions that have motion, for example in a scene monitored by a security camera system. Conventional video motion detection is used to find zones 28,29 and/or times in the video data where motion is detected, either in real time or post-processing. Relatively small data structures 30,50 are created that store metadata or "motion data," as distinguished from the underlying video data, in which regions of detected motion are indicated compactly, for example using one bit 32 per zone or one bit 52 per field, to enable fast searching to find motion by searching the motion data structure rather than the digital video record.

17 Claims, 2 Drawing Sheets

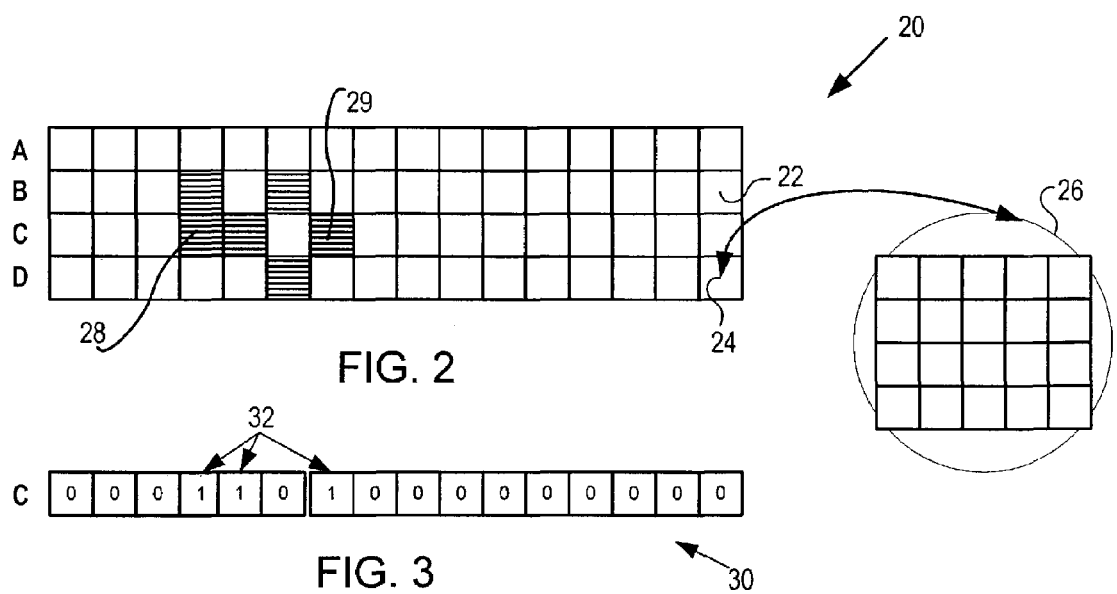
FIG. 2
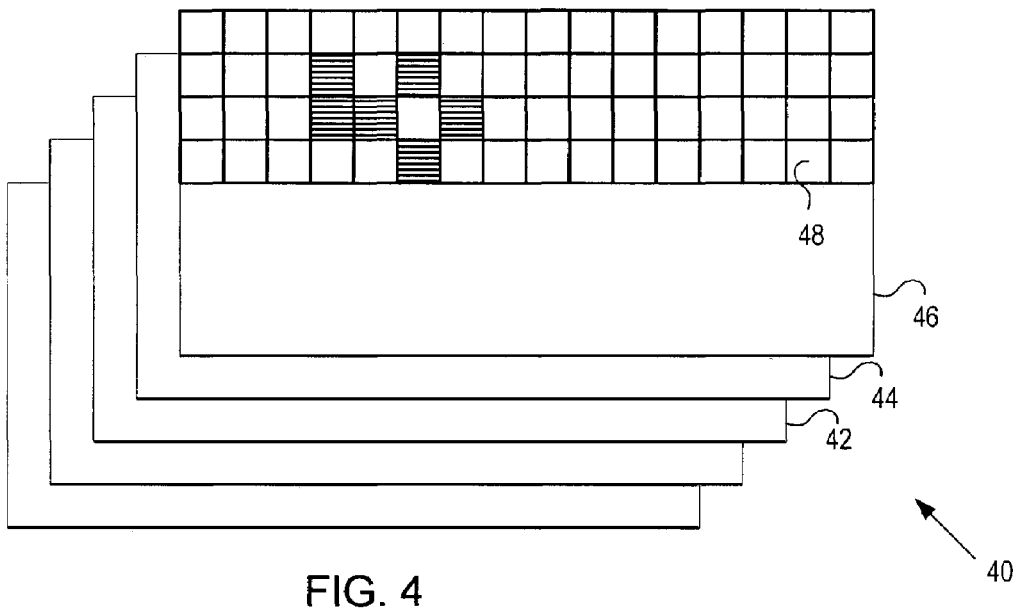
FIG. 3
FIG. 4
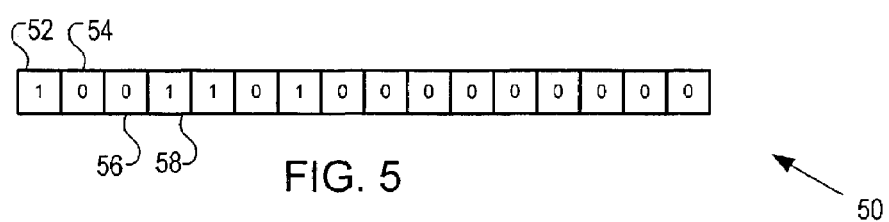
FIG. 5

HIGH-SPEED SEARCH OF RECORDED VIDEO INFORMATION TO DETECT MOTION

RELATED APPLICATIONS

This application claims priority from U.S. Provisional Application No. 60/364,874 filed Mar. 14, 2002.

COPYRIGHT NOTICE

® 2002-2003 General Electric Company. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This application pertains to digital video recording and, more specifically, relates to increasing the speed of searching through recorded video information to find regions where motion was detected at the time of recording.

BACKGROUND OF THE INVENTION

Digital Video Recorders (DVRs) are commonly used with associated video cameras and monitors by the security industry to monitor and record sites under surveillance. A DVR can typically record data from several video cameras simultaneously for several days or several weeks. All video data are recorded in digital format on a digital medium, such as a hard disk drive, which replaces the traditional video cassette tape recorder (VCR).

One advantage of a DVR over a VCR is that recorded video data on a DVR are directly accessible if the position of the data on the digital medium is known. In other words, one can directly access a desired area of the stored data for viewing, more or less, whereas with a VCR the user has to re-wind or play the tape to the position at which the data are stored before the video data can be viewed.

The ability to directly access recorded data quickly on a DVR has in turn led to various methods of searching for data on DVRs, including a date/time index, alarm events, and text associated with video. An example of text associated with video is Automated Teller Machine (ATM) transaction information stored together with the video of a person using an ATM cash dispenser. The transaction data can be used to quickly find the associated video. An alarm event might be, for example, the opening (or closing) of a door, window or safe.

A DVR typically includes video motion detection (VMD) capability that interprets as motion changes in video scenes over time. VMD is done in real time, while the video data are being viewed or recorded. Typically this built-in VMD capability is used to alert the DVR user to unexpected motion or simply to improve recording efficiency. Recording efficiency is improved by recording only when motion is detected by the system or at a faster rate when motion is detected. This application of VMD has been common in the security industry for many years.

To illustrate, commercial security systems are known that enable the user to configure or select specific motion detection parameters. A rectangular grid pattern typically is used to define substantially contiguous but non-overlapping "zones" in a video scene or camera view. Such a grid may define, for example, 16 by 16, or a total of 256 zones. Some systems allow specific zones to be selected for motion detection. It is also known to select the size of one or more zones, etc.

VMD has now been used in DVRs in the security industry to search recorded data for motion during a selected period of time. The following is one example of a situation in which such a search application is performed. When an article has been stolen sometime during the previous day and a surveillance camera recorded the scene of the theft, a user sets up VMD on the DVR to look for any motion in the specific region or zone where the article itself had been located, and plays back only the instances during which the theft could have occurred. The user can typically set VMD search boundaries or parameters that specify the area of a scene in which to look for motion (spatial parameters), such as the zones described above, and a time/date period within which to limit the search (time parameters).

A focused VMD search/playback of this type potentially saves the user a lot of time because, without it, a search of this type was performed by a user playing through a VMD all of the video data recorded for the previous day to look for the motion representing the recording of the theft. Thus the VMD aids the user by finding motion in the recorded data, but it requires processing through all of the video data in which motion might be found. Such a VMD search is, therefore, relatively slow and typically requires a powerful VMD processor. The need remains, therefore, for improvements in digital video recording, search and playback to reduce the time and processing costs necessary to locate and play a region (temporal and/or spacial) where motion was detected.

SUMMARY OF THE INVENTION

An object of the invention is to enable a DVR to do a faster search for motion in recorded video data. One aspect of the invention is a method of storing digital video data to facilitate rapid searching to find motion.

BRIEF DESCRIPTION OF THE DRAWINGS

FIG. 2 is a conceptual diagram of a rectangular video field partitioned into discrete zones.

FIG. 3 illustrates a digital data structure that supports rapid searching to find zones in the field of FIG. 2 are identified as exhibiting motion.

FIG. 4 is a conceptual diagram of digital data representing a temporal series of video fields partitioned into discrete zones for purposes of video motion detection.

FIG. 5 illustrates digital data that support rapid searching to determine which fields in the temporal sequence of FIG. 4 are identified as exhibiting motion.

DETAILED DESCRIPTION OF PREFERRED EMBODIMENTS

Figure 1:
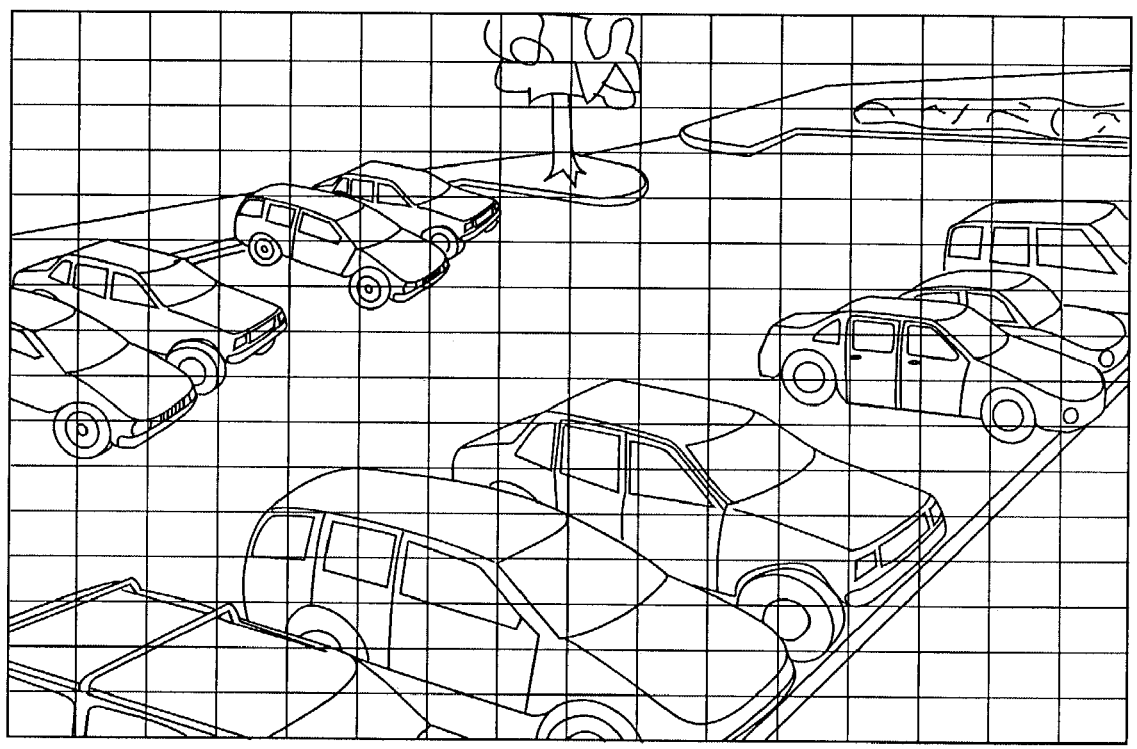
FIG. 1 illustrates a video motion search grid overlying a video image of a parking lot.

During recording of the video data, a VMD apparatus based on prior art is used to flag areas in a camera scene for motion on a field-by field basis. Prior art for a VMD processor used in a DVR typically divides each camera scene into a matrix of "zones," from as few as 4 zones (a 2×2 matrix) to as many as 256 zones (a 16×16 matrix). The matrix can be larger. A DVMRe (Digital Video Multiplexer Recorder—Ethernet capable and Internet ready) manufactured by Kalatel, Inc. is one instrument that performs these functions. The video data acquired by the DVMRe can be viewed on a PC in which WaveReader™ software, also provided by Kalatel, Inc., is stored. The WaveReader™ software enables viewing of live or recorded video data acquired by the DVMRe.

FIG. 1 shows an exemplary image of a parking lot, on which image a 16×16 matrix of 256 rectangular zones is superimposed. The user can select which zones to monitor for motion, select sensitivity, etc.

According to one aspect of the invention, in a presently preferred embodiment, at the time video data are being recorded, each zone is allocated a single bit to indicate the presence or absence of motion in that zone, as determined by known VMD techniques and equipment in accordance with user selected motion detection parameters. For example, in the case of a 16×16 matrix of zones, 256 bits (32 8-bit bytes) of data are thus created for each field of video to record the presence or absence of motion in each zone. These "motion bits" are stored with the digital video data for that field in, for example, a header to that video field. The total number of motion bits comprises much less data than the original digital video data.

To illustrate further, FIG. 2 is a conceptual diagram of a rectangular video field 20 partitioned into discrete zones, e.g. zones 22,24. The field 20 has four rows A-D and 16 columns for purposes of illustration, for a total of 64 zones. Depending on the resolution of the video data, each zone can consist of multiple pixels. For example, zone 24 is enlarged at 26 to show that it consists of 4×5 pixels. In FIG. 2, selected zones, e.g. zones 28,29 are shaded to indicate that motion was detected in those zones in the video recording.

FIG. 3 illustrates a simple data structure in which only one bit location is allocated for each zone (only row "C" is shown). Here, the bit locations 32 (there are three) that correspond to the zones in row "C" where motion was detected are set to binary "1" while the remaining bits in structure 30 are set to binary "0". The same principle can be applied to the other rows of the field 20 to form corresponding data structures. To rapidly find motion, instead of searching the entire video record, one need only search the relatively few bits of the data structures 30. These bits are referred to herein and in the appended claims as metadata or motion data, as distinguished from the underlying picture or video data.

In one implementation of the invention, the recorded motion bits can be searched to find the video data representing in a user-defined area of the camera scene where motion occurred, the area being defined by specific zones. Because the motion bit data are very much less and far simpler than the video data, a much faster and much simpler search can be performed. Moreover, the search can be performed without the use of VMD processing.

In a more advanced implementation of the invention, an even faster search than that performed by the simplest implementation described above can be performed by additional simple processing of the motion bits at the time of recording. The motion bits for each camera are logically "OR'd" with other motion bits from the same camera in both the spatial domain and the time domain. The OR'd bits are effectively summary data for each camera for longer periods of time and for larger spatial areas covering several zones, and result in much less video data to be searched. The search of OR'd bits is hence much quicker and is used to find a general region of interest, in time and in space, that includes motion specified by the user's search parameters. Thereafter, only the motion bits in that region of interest need to be searched to find the actual field(s) of video data with motion.

Multiple hierarchical levels of OR'd bits, in space and time, can be used to further reduce search data and to find regions of interest more quickly and with less total processing. For example, one motion data structure may have one bit corresponding to each field over time. At thirty frames per second, ten seconds of video would require only 300 bits of this "metadata," with one bit per field, to quickly find motion. For each field or time where motion was detected, the corresponding bit in the data structure is set to a first binary value; and for each field or time where motion was not detected, the corresponding bits in the data structure are set to the opposite binary value. It would take only about two or three machine instructions to search this data to find the bits that indicate motion.

FIG. 4 illustrates an application of the invention to spacial zones over time. It shows a temporal series 40 of fields, for example fields 42, 44 and 46. Each field is partitioned into rectangular zones, for example, zone 48. Within one field, say 46, the zones where motion is detected (indicated by shading) can be represented by corresponding bits in a simple data structure as explained above with reference to FIGS. 2 and 3. Further, these motion bits over the entire field can be (Boolean) OR'd together to determine a single bit that indicates, for each field over time, whether or not motion is detected. This data can be collected in a simple data structure 50 as shown in FIG. 5. Here, each bit corresponds to one of the fields of FIG. 4. The first bit 52 indicates that motion was detected in field 46, while the next two bits 54,56 indicate no motion in fields 44,42 respectively. Bit 58 indicates motion detected in the next field, and so on.

When recorded data are moved to other media from the original recorded medium, the ability to search is retained and the search level retained will be in accordance with the amount of data transferred.

Advantages of the present invention are several. First, the search on motion in recorded images can be accomplished with much less processing power than that consumed in prior art. Second, the search on motion in recorded images can be accomplished much faster than that accomplished in prior art. The recorded data retain their fast search capability if transported if the described motion data is included in the file.

It will be obvious to those having skill in the art that many changes may be made to the details of the above-described embodiments without departing from the underlying principles of the invention. The scope of the present invention should, therefore, be determined only by the following claims.

The invention claimed is:

1. A computer-implemented method of high-speed searching for spatial regions of motion in stored digital video data, comprising:
   during storing of the digital video data, identifying spatial regions of motion in the digital video data and creating an indication of each identified spatial region of motion in the digital video data, wherein said creating an indication of each identified spatial region of motion in the digital video data includes:
      initializing a data structure having a series of bits each corresponding to a predetermined zone of the video image data;
      for each zone where motion was detected, setting the corresponding bit in the data structure to a first binary value; and for each zone where motion was not detected, setting the corresponding bits in the data structure to a second binary value;

logically "OR'ing" a first plurality of the bits in the data structure so as to obtain a first zone motion summary data value;

logically "OR'ing" a second plurality of the bits in the data structure so as to obtain a second zone motion summary data value;

logically "OR'ing" the first zone motion summary data value and the second zone motion summary data value to obtain a video image zone motion summary data binary value; and searching for the identified spatial regions of motion in the stored video digital data, comprising searching the data structure to find the bits set to the first binary value based at least in part on the video image zone motion summary data binary value.

2. A computer-implemented method according to claim 1 and further comprising storing the data structure in a header of the stored digital video data.

3. A computer-implemented method according to claim 1 and further comprising storing the data structure separately from the stored digital video data.

4. The computer-implemented method according to claim 1, wherein searching the data structure to find the bits set to the first binary value comprises searching the first zone motion summary data value and the second zone motion summary data value to find at least one zone motion summary data value that is equivalent to the first binary value.

5. The computer-implemented method according to claim 1, wherein each predetermined zone of the video image data comprises a row of pixels.

6. The computer-implemented method according to claim 1, wherein each predetermined zone of the video image data comprises a column of pixels.

7. A computer-implemented method of high-speed searching for time regions of motion in stored digital video data, comprising:

during storing of the digital video data, identifying time regions of motion in the digital video data and creating an indication of each identified time region of motion in the digital video data, wherein said creating an indication of each identified time region of motion in the digital video data includes:

initializing a data structure having a series of bits each corresponding to a predetermined time of the video image data;

for each time where motion was detected, setting the corresponding bit in the data structure to a first binary value; and for each time where motion was not detected, setting the corresponding bits in the data structure to a second binary value;

logically "OR'ing" a first plurality of the bits in the data structure so as to obtain a first temporal motion summary data value;

logically "OR'ing" a second plurality of the bits in the data structure so as to obtain a second temporal motion summary data value;

logically "OR'ing" the first temporal motion summary data value and the second temporal motion summary data value to obtain a video image temporal motion summary data binary value; and searching for the identified temporal regions of motion in the stored video digital data, comprising searching the data structure to find the bits set to the first binary value based at least in part on the video image temporal motion summary data binary value.

8. A computer-implemented method according to claim 7 further comprising:

during storing of the digital video data, identifying spatial regions of motion in the digital video data and creating an indication of each identified spatial region of motion in the digital video data, wherein said creating an indication of each identified spatial region of motion in the digital video data includes:

initializing a secondary data structure having a series of bits each corresponding to a predetermined zone of the video image data;

for each zone where motion was detected, setting the corresponding bit in the secondary data structure to the first binary value; and for each zone where motion was not detected, setting the corresponding bits in the secondary data structure to the second binary value;

logically "OR'ing" a first plurality of the bits in the data structure so as to obtain a first zone motion summary data value;

logically "OR'ing" a second plurality of the bits in the data structure so as to obtain a second zone motion summary data value;

logically "OR'ing" the first zone motion summary data value and the second zone motion summary data value to obtain a video image zone motion summary data binary value; and searching for the identified spatial regions of motion in the stored video digital data, comprising searching the secondary data structure to find the bits set to the first binary value based at least in part on the video image zone motion summary data binary value.

9. A computer-implemented method according to claim 7 and further comprising storing the data structure separately from the stored digital video data.

10. A computer-implemented method according to claim 7 further comprising storing the data structure in the stored digital video data.

11. The computer-implemented method according to claim 7, wherein searching the data structure to find the bits set to the first binary value comprises searching the first temporal motion summary data value and the second temporal motion summary data value to find at least one temporal motion summary data value that is equivalent to the first binary value.

12. A computer-implemented method of high-speed searching for regions of motion in stored digital video data, comprising:

during storing of the digital video data, identifying spatial regions of motion in the digital video data and creating an indication of each identified spatial region of motion in the digital video data, wherein said creating an indication of each identified spatial region of motion in the digital video data includes:

initializing a first data structure having a series of bits each corresponding to a predetermined zone of the video image data;

for each zone where motion was detected, setting the corresponding bit in the first data structure to the first binary value; and for each zone where motion was not detected, setting the corresponding bits in the first data structure to the second binary value;

logically "OR'ing" the motion bits in the first data structure so as to obtain first motion summary data;

during storing of the digital video data, identifying time regions of motion in the digital video data and creating an indication of each identified time region of motion in the digital video data, wherein said creating an indication of each identified time region of motion in the digital video data includes:
  initializing a second data structure having a series of bits each corresponding to a predetermined time of the video image data;
  for each time where motion was detected, setting the corresponding bit in the second data structure to the first binary value; and
  for each time where motion was not detected, setting the corresponding bits in the second data structure to the second binary value;
logically "OR'ing" the motion bits in the second data structure so as to form second motion summary data; and
searching for the identified regions of motion in the stored video digital data, comprising searching the summary data structure to find the summary motion bits having the first binary value, based at least in part on the first motion summary data and the second motion summary data.

13. A computer-implemented method of high-speed searching for motion in stored digital video data, comprising:
  initializing a plurality of two-dimensional video zone motion information data structures each having a plurality of rows, each row having a series of bits, each bit corresponding to one of a plurality of video zones within a video field;
  initializing a one-dimensional video field motion information data structure having a series of bits each corresponding to the video field at one of a plurality of specific points in time;
  during storing of the digital video data, for each of the plurality of video zones within the video field at each of the plurality of specific points in time, setting a corresponding one of the series of bits in a corresponding one of the plurality of two-dimensional video zone motion information data structures to a first binary value if motion is detected within the video zone or to a second binary value if motion is not detected within the video zone;
  for each of the plurality of rows in each of the plurality of two-dimensional video zone motion information data structures, logically "OR'ing" the series of bits in the row to obtain a corresponding one of a plurality of video zone row motion bit binary values; and
  searching for at least one zone of motion within the video field over the specified period of time, the searching comprising determining whether the spatial-temporal motion binary value is the first binary value or the second binary value.

14. The computer-implemented method of claim 13, further comprising, for each of the plurality of specific points in time, logically "OR'ing" the corresponding plurality of video zone row motion bit binary values to obtain a video field motion bit binary value and setting a corresponding one of the series of bits in the one-dimensional video field motion information data structure to the video field motion bit binary value.

15. The computer-implemented method of claim 14, further comprising for each specific point in time within a specified period of time, logically "OR'ing" the corresponding plurality of video field motion bit binary values to obtain a spatial-temporal motion binary value.

16. The computer-implemented method of claim 15, the searching further comprising, if the spatial-temporal motion is the first binary value, determining at which of the plurality of specific points in time motion was detected in the video field by analyzing one or more corresponding entries in the one-dimensional video field motion information data structure.

17. The computer-implemented method of claim 16, the searching further comprising, for each of the plurality of specific points in time motion was detected in the video field, determining in which of the plurality of video zones within the video field motion was detected by analyzing one or more corresponding entries in each corresponding two-dimensional video zone motion information data structure.

* * * * *